Aug. 7, 1962 R. H. MALLARD 3,048,406

SOUND REPRODUCING MACHINES

Filed Sept. 28, 1959

INVENTOR

RICHARD HENRY MALLARD

BY Maxwell E. Sparrow

ATTORNEY 3,048,406

SOUND REPRODUCING MACHINES

Richard Henry Mallard, London, England, assignor to Foster-Mallard Limited, London, England Filed Sept. 28, 1959, Ser. No. 842,912
4 Claims. (Cl. 274—10)

This invention relates to sound reproducing machines of the kind in which grooves disc-shaped records are used in association with a pick-up device including a stylus which runs in the groove of the records, means being provided for supporting a plurality of records in an upper position above a turntable and rotating them so that the recording on the underside of each record can be played, using an upwardly projecting stylus on the pick-up, before that record is dropped on to the turntable, the recording on the upper side of each record being played after the latter has dropped, using another, downwardly projecting, stylus on the pick-up.

It is important that, during the playing of the recording on its underside, a record shall be held as nearly as possible in a plane parallel to that of the turntable, and the object of the present invention is to provide improved means for holding a record or records in such a plane and assuming that rotation is transmitted to it or them.

According to the invention, in a sound reproducing machine of the kind referred to and having, on a spindle upstanding from the turntable, means for releasably supporting the records in the upper position an upper turntable adapted to rest on the uppermost of the said records and to be rotated by the said spindle is held in a plane substantially perpendicular to the axis of the spindle by means independent of the said spindle.

The upper turntable is preferably rotatably mounted on an arm carried by a rod slidable and rotatable in a guide parallel to the spindle and positioned radially beyond the periphery of the turntable.

The upper turntable may be driven by a key on the spindle engaging a keyway in the said upper turntable.

The arm may be formed with a ring-shaped portion, the upper turntable is provided with a hub having outwardly extending radial flanges extending one on each side of the said ring-shaped portion to locate the upper turntable on the said arm.

The hub may be formed by two discs clamped together and each including one of the said flanges.

The invention is hereinafter described with reference to the accompanying drawings which show, by way of example, one form of sound reproducing machine embodying the invention. Parts of the machine which have no relation to the present invention have been omitted.

Figures 1, 2:
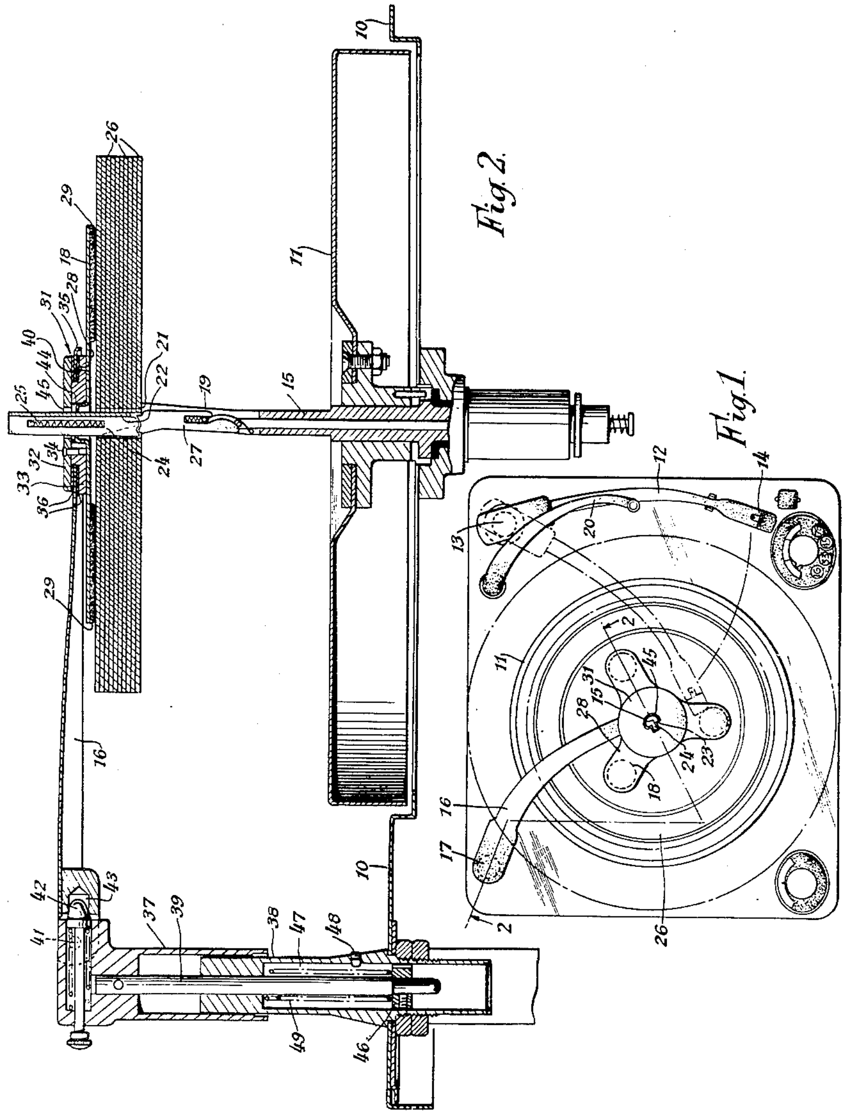
FIGURE 1 is a plan view of the machine.
FIGURE 2 is a partial section approximately on the line 2—2 of FIGURE 1, and on a larger scale.

Referring to the drawings, the sound reproducing machine according to the invention comprises a base-plate 10 on which is rotatably mounted a turntable 11. A pick-up arm 12 is mounted to swing about a pivot at 13 and supports a pick-up 14 of any suitable type. A spindle 15 standing up from the centre of the turntable is adapted to support a plurality of disc-shaped records for dropping one-by-one on to the turntable. An arm 16 mounted to swing about a pivot at 17 has rotatably mounted on it an upper turntable 18 which is held by the said arm in plane parallel to that of the turntable 11 and is adapted to be rotated by the spindle 15.

The machine embodies mechanism, forming no part of this invention and not illustrated in the drawings, for moving the pick-up arm outwardly after the playing of each recording and then inwardly for commencing to play another recording under the control of surging mechanism including a feeler arm 20 and for selecting whether the pick-up is lifted into engagement with a record on the spindle or lowered into engagement with a record on the turntable, a suitable mechanism for this purpose having been described in our earlier patent application No. 739,455. Means are also provided, which may also be as described in that earlier patent application, for reversing the direction of rotation of the turntable 11 and spindle 15.

The spindle 15 has an oblique portion 19 defining at its upper end a shoulder 21 above which the spindle has a concentric portion 22 to locate records supported on the shoulder 21, the concentric portion 22, which has a flat 23 on one side, as shown in FIGURE 1, being grooved radially from that side to accommodate a keeper 24 which projects from the flat 23. The keeper 24, which is urged downwardly by a coiled compression spring 25, serves to locate concentrically on the spindle portion 22 records 26 which are supported on the shoulder 21, and is lifted by camming action of a record-release finger 27 pivotally mounted in the oblique portion 19 of the spindle to free the lowermost record 26 for lateral displacement by the finger.

The upper turntable 18 comprises a three-armed spider 28 having discs 29 of rubber or like material mounted on the undersides of its arms to rest on the surface of the uppermost record 26, and a hub 31 formed by upper and lower discs 32 and 33 clamped together by screws 34, the spider 28 being rivetted to the lower disc 33. The lower disc 33 is formed on its upper side with a peripheral rebate to provide a circumferential groove 40 between the two discs, and a ring-shaped end portion 35 of the arm 16 lies in the said groove 40 between rings 36, 36 of anti-friction material such as, for example polytetrafluoroethylene, commonly known under the name "Teflon." The arm 16, at its other end, is attached to a tubular head 37 slidable on a vertical pillar 38 secured to the base-plate 10, a stem 39 concentric with the head 37 being slidable in a bore in the pillar. The arm 16 is capable of being moved about a horizontal pivot at 41 relative to the head 37, but is adapted to be locked in a horizontal position by a spring-loaded bolt 42 engaging a recess 43 in the arm.

The lower disc 33 of the hub 31 has a central hole 44 through which the spindle 15 passes with substantial clearance, the upper disc 32 being formed with a central hole 45 of the same shape as the cross-sectional outline of the upper portion 22 of the spindle and the keeper 24, so that the said keeper acts as a key, and part of the hole 45 as a keyway, to transmit rotation from the spindle 15 to the upper turntable 18.

The arm 16 is free to rotate about the pillar 38, and can be lifted clear of the spindle 15 so that it can be swung aside to allow records to be placed on or removed from the spindle 15, a grooved collar 46, fixed to the item 39 in an enlarged portion 47 of the bore of the pillar, co-operating with a grub-screw 48 passing through a radial hole in the pillar to retain the arm in a position such that the upper turntable 18 is above the top of the spindle 15 except when the said upper turntable is co-axial with the spindle.

A coiled compression spring 49 acting downwardly on the collar 46 assists gravity to urge the upper turntable 18 downwardly.

The upper turntable 18, being rotated by the spindle 15, transmits rotation from the said spindle to the records 26, and, being held in a position parallel to the turntable by the arm 16, also holds the said records parallel to the turntable, its weight being sufficient to prevent it from being lifted by any tendency of the records to tilt. The hole 45 in the upper disc 32 of the hub is a loose fit over the spindle 15, and the said disc is of small thickness, so that the spindle itself provides insufficient location for the upper turntable to prevent it from tilting. Thus, any substnatial undulating movement of the pick-up during playing of a recording on the underside of a record is avoided, and reduction of the quality of reproduction which is caused by such undulating movement is avoided.

The use of an arm such as the arm 16 to hold the upper turntable against tilting enables the height of the machine to be much reduced as compared with the machine in which tilting is prevented by a long bearing on the spindle.

I claim:

1. A sound reproducing machine comprising a turntable, a spindle extending upwardly from said turntable and being rotatable therewith, means on said spindle for supporting a plurality of records co-axially above said turntable, means for releasing said records one-by-one to fall onto said turntable, a pick-up adapted to be brought alternately into playing engagement with the underside of the lowermost record supported on said spindle and with the top side of a record on said turntable, an upper turntable adapted to rest on the uppermost of said records supported on said spindle, interengaging means on said spindle and on said upper turntable to transmit rotation from said spindle to said upper turntable, and supporting means independent of said spindle for holding said upper turntable in a plane perpendicular to the axis of said spindle, said upper turntable being rotatably mounted on said supporting means.

2. A sound reproducing machine comprising a turntable, a spindle extending upwardly from said turntable and rotatable therewith, means on said spindle for supporting a plurality of records co-axially above said turntable, means for releasing said records one-by-one to fall onto said turntable, a pick-up adapted to be brought alternately into playing engagement with the underside of the lowermost record supported on said spindle and with the top side of a record on said turntable, a guide positioned radially beyond the periphery of said turntable, a rod slidable and rotatable in said guide, an arm carried by said rod, said arm adapted to extend over said turntable, an upper turntable mounted on said arm, said upper turntable adapted to engage slidably with said spindle so as to rest on the uppermost record thereon, bearing means holding said upper turntable rotatably to said arm, and interengaging means on said spindle and on said upper turntable to transmit rotation from said spindle to said upper turntable.

3. A sound reproducing machine according to claim 2, said bearing means comprising a ring-shaped portion of said arm, a hub on said upper turntable having two parallel flanges extending radially outwardly above and below said ring-shaped portion, respectively, and rings of anti-friction material disposed between said flanges and said ring-shaped portion.

4. A sound reproducing machine according to claim 3, said hub comprising two discs each enclosing one of said flanges, and means clamping said discs one to the other.

References Cited in the file of this patent

UNITED STATES PATENTS

| | | |
|---|---|---|
| 1,436,129 | Watson | Nov. 21, 1922 |
| 1,940,089 | Harrison | Dec. 19, 1933 |
| 2,628,843 | Comstock | Feb. 17, 1953 |
| 2,643,127 | Gregg et al. | June 23, 1953 |
| 2,684,248 | Jahncke | July 20, 1954 |
| 2,776,837 | Mueller | Jan. 8, 1957 |

FOREIGN PATENTS

| | | |
|---|---|---|
| 325,514 | Switzerland | Dec. 31, 1957 |